(12) United States Patent
Myron et al.

(10) Patent No.: US 12,248,748 B2
(45) Date of Patent: *Mar. 11, 2025

(54) GENERATING ENCODED TEXT BASED ON SPOKEN UTTERANCES USING MACHINE LEARNING SYSTEMS AND METHODS

(71) Applicant: T-Mobile USA, Inc., Bellevue, WA (US)

(72) Inventors: Peter P. Myron, New Braunfels, TX (US); Michael Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,095

(22) Filed: Jan. 16, 2024

(65) Prior Publication Data

US 2024/0152684 A1 May 9, 2024

Related U.S. Application Data

(63) Continuation of application No. 17/841,518, filed on Jun. 15, 2022, now Pat. No. 11,880,645.

(51) Int. Cl.
*G06F 17/00* (2019.01)
*G06F 40/126* (2020.01)
(Continued)

(52) U.S. Cl.
CPC .......... *G06F 40/126* (2020.01); *G06F 40/166* (2020.01); *G06N 20/00* (2019.01); *G10L 15/22* (2013.01); *G10L 2015/226* (2013.01)

(58) Field of Classification Search
CPC ..... G06F 40/126; G06F 40/166; G06N 20/00; G10L 15/22; G10L 2015/226
See application file for complete search history.

(56) References Cited

U.S. PATENT DOCUMENTS

| 5,867,817 A | 2/1999 | Catallo et al. |
| 6,081,780 A | 6/2000 | Lumelsky |

(Continued)

FOREIGN PATENT DOCUMENTS

| EP | 1046156 A1 | 10/2000 |
| EP | 1604350 A2 | 12/2005 |

(Continued)

OTHER PUBLICATIONS

Liu, Bing. "Sentiment analysis and subjectivity." Handbook of natural language processing 2.2010 (2010): 627-666 (Year: 2010).*

(Continued)

*Primary Examiner* — Andrew T McIntosh
(74) *Attorney, Agent, or Firm* — Perkins Coie LLP

(57) ABSTRACT

Systems and methods for generating encoded text representations of spoken utterances are disclosed. Audio data is received for a spoken utterance and analyzed to identify a nonverbal characteristic, such as a sentiment, a speaking rate, or a volume. An encoded text representation of the spoken utterance is generated, comprising a text transcription and a visual representation of the nonverbal characteristic. The visual representation comprises a geometric element, such as a graph or shape, or a variation in a text attribute, such as font, font size, or color. Analysis of the audio data and/or generation of the encoded text representation can be performed using machine learning.

20 Claims, 6 Drawing Sheets

(51) Int. Cl.
*G06F 40/166* (2020.01)
*G06N 20/00* (2019.01)
*G10L 15/22* (2006.01)

(56) References Cited

U.S. PATENT DOCUMENTS

| | | |
|---|---|---|
| 6,658,389 B1 | 12/2003 | Alpdemir |
| 7,013,276 B2 | 3/2006 | Bickley et al. |
| 7,577,569 B2 | 8/2009 | Roth et al. |
| 8,117,268 B2 | 2/2012 | Jablokov et al. |
| 8,452,602 B1 | 5/2013 | Bringert et al. |
| 8,630,860 B1 | 1/2014 | Zhang et al. |
| 9,594,744 B2 | 3/2017 | Sak et al. |
| 9,711,145 B2 | 7/2017 | Lebeau et al. |
| 9,715,877 B2 | 7/2017 | Sims et al. |
| 9,721,373 B2 | 8/2017 | Marsella |
| 9,740,686 B2 | 8/2017 | Johansson |
| 10,573,312 B1 | 2/2020 | Thomson et al. |
| 10,872,615 B1 | 12/2020 | Garrod |
| 10,878,808 B1 | 12/2020 | Mathias et al. |
| 10,930,302 B2 | 2/2021 | Breedvelt-schouten et al. |
| 11,176,928 B2 | 11/2021 | Schairer et al. |
| 11,222,620 B2 | 1/2022 | Chen et al. |
| 11,232,780 B1 | 1/2022 | Iyer et al. |
| 11,238,857 B2 | 2/2022 | Skobeltsyn et al. |
| 11,335,324 B2 | 5/2022 | Biadsy et al. |
| 2004/0049388 A1 | 3/2004 | Roth et al. |
| 2006/0194181 A1 | 8/2006 | Rosenberg |
| 2007/0239455 A1 | 10/2007 | Groble et al. |
| 2009/0112572 A1 | 4/2009 | Thorn |
| 2009/0228274 A1 | 9/2009 | Terrell et al. |
| 2009/0248415 A1 | 10/2009 | Jablokov et al. |
| 2012/0201362 A1 | 8/2012 | Crossan et al. |
| 2020/0380952 A1 | 12/2020 | Zhang et al. |
| 2020/0402507 A1 | 12/2020 | Neelakantan et al. |
| 2021/0090592 A1 | 3/2021 | Lee et al. |
| 2021/0158813 A1 | 5/2021 | Sivasubramanian et al. |
| 2021/0193141 A1 | 6/2021 | Alipov et al. |
| 2021/0350795 A1 | 11/2021 | Kenter et al. |
| 2022/0013126 A1 | 1/2022 | Haynor et al. |
| 2022/0051654 A1 | 2/2022 | Finkelstein et al. |
| 2022/0139373 A1 | 5/2022 | Weisz et al. |
| 2022/0270594 A1* | 8/2022 | Sejpal .................. G06N 3/045 |
| 2022/0374274 A1 | 11/2022 | Chen et al. |

FOREIGN PATENT DOCUMENTS

| | | |
|---|---|---|
| EP | 3830819 A1 | 6/2021 |
| EP | 3776536 B1 | 4/2022 |
| JP | 2002108856 A | 4/2002 |
| JP | 6704525 B2 | 5/2020 |
| JP | 2020144648 A | 9/2020 |
| WO | 2021113443 A1 | 6/2021 |
| WO | 2021118543 A1 | 6/2021 |
| WO | 2021142055 A1 | 7/2021 |
| WO | 2021162779 A1 | 8/2021 |

OTHER PUBLICATIONS

Pérez-Rosas, Verónica, Rada Mihalcea, and Louis-Philippe Morency. "Utterance-level multimodal sentiment analysis." Proceedings of the 51st Annual Meeting of the Association for Computational Linguistics (vol. 1: Long Papers). 2013 (Year: 2013).*

McKeown, Gary, et al. "The semaine database: Annotated multimodal records of emotionally colored conversations between a person and a limited agent." IEEE transactions on affective computing 3.1 (2011): 5-17 (Year: 2011).*

Cho, Sangwoo et al. "StreamHover: Livestream Transcript Summarization and Annotation." arXiv:2109.05160v1, Sep. 11, 2021, 18 pages.

Cribb, Michael et al. "The Transcription and Representation of Spoken Political Discourse in the UK House of Commons." International Journal of English Linguistics vol. 8, No. 2 (2018), 15 pages.

* cited by examiner

GENERATING ENCODED TEXT BASED ON SPOKEN UTTERANCES USING MACHINE LEARNING SYSTEMS AND METHODS

CROSS-REFERENCE TO RELATED APPLICATIONS

This application is a continuation of U.S. patent application Ser. No. 17/841,518, filed on Jun. 15, 2022, entitled GENERATING ENCODED TEXT BASED ON SPOKEN UTTERANCES USING MACHINE LEARNING SYSTEMS AND METHODS, which is hereby incorporated by reference in its entirety.

BACKGROUND

When people communicate via speech, a significant portion of information is conveyed via nonverbal communication, such as based on the speaker's pitch, timbre, volume, tone of voice, inflection, speaking rate, and/or changes in any of the foregoing characteristics. Other forms of nonverbal communication include eye contact, facial expressions, gestures, posture, and/or body language. Nonverbal communication further includes the use of social cues, kinesics, distance (proxemics), and/or physical characteristics. Nonverbal communication can also include the use of time (chronemics) and eye contact and the actions of looking while talking and listening, frequency of glances, patterns of fixation, pupil dilation, blink rate (oculesics), and so forth. Collectively, nonverbal communication contains rich information that adds to the meaning of the content of a person's speech, such as the speaker's mood or sentiment, demeanor, intended meaning, and so forth. For example, without changing the content of a spoken utterance (i.e., the words spoken), the meaning of the utterance can differ depending on whether the speaker conveys via nonverbal communication (e.g., tone of voice and/or inflection) that the utterance is intended to be sarcastic.

BRIEF DESCRIPTION OF THE DRAWINGS

Detailed descriptions of implementations of the present invention will be described and explained through the use of the accompanying drawings.

Figure 1:
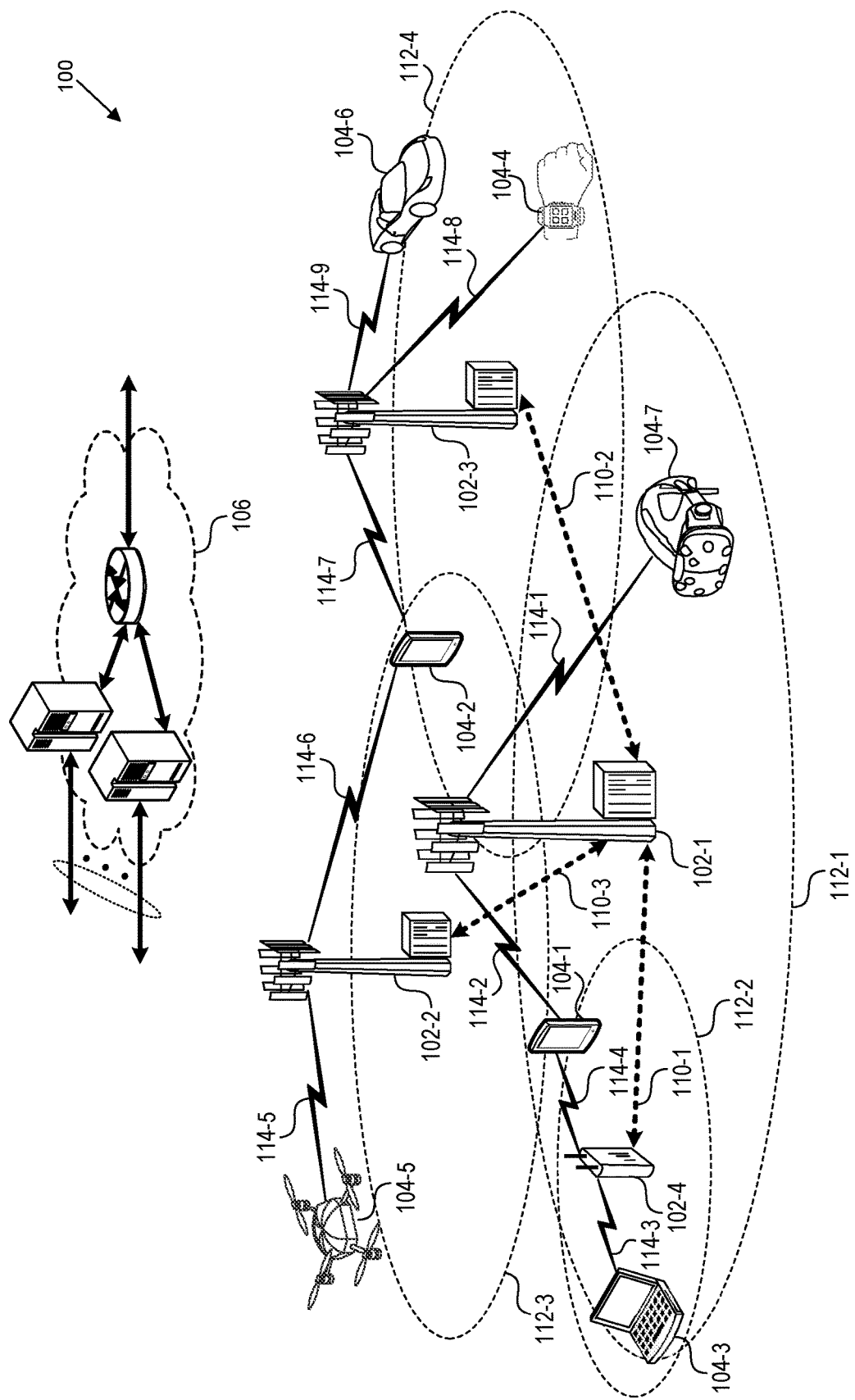
FIG. 1 is a block diagram that illustrates a wireless communications system that can implement aspects of the present technology in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Although computing devices, such as smartphones or other mobile devices, can facilitate various forms of text-based communications (e.g., text messaging, speech-to-text messaging, online or social media posting, email, word processing), these devices present various technical challenges related to conveying nonverbal information via text-based communications, such as sentiment, tone, volume, pitch, inflection, and so forth. As used herein, "nonverbal information" includes any information other than a literal text representation of a typed or spoken utterance, and includes nonverbal communications and/or characteristics, such as tone, inflection, demeanor, mood, sentiment, volume, pitch, visual information, gestures, and so forth. These technical challenges arise because conventional mobile devices are not configured to efficiently capture and/or convey nonverbal information to accompany text (e.g., when using speech-to-text). For example, while messaging applications on mobile devices are widely used to convey text messages, they are currently incapable of capturing and conveying a sender's sentiments (or other nonverbal cues) associated with that text, let alone sentiments associated with different components (e.g., words, phrases, sentences, etc.) of the text. As a result, when devices use only text to communicate information, there exists a risk that important nonverbal information is omitted or lost. Thus, a recipient or reader of the text can be confused or can misinterpret the meaning of the text due to the omitted or lost nonverbal information.

Users attempt to avoid these technical problems, for example, by adding emojis or other characters, which can only partially compensate for loss of nonverbal information. Additionally, some online communities have developed conventions to manually add meaning to text, such as by manually appending a combination of characters (e.g., adding "/s" to indicate sarcasm) or manually modifying text to indicate intended meaning (e.g., using all caps, italics, subscript, superscript). However, these technologies for manually supplementing text-based communications are inefficient and incomplete because they provide only limited options for supplementing text-based communications, and they rely on users (i.e., both the senders and the receivers) to learn and use obscure conventions that might not be widely known or understood. Furthermore, existing technologies require users to compensate for the shortcomings of mobile devices by recreating nonverbal information that mobile devices are unable to adequately capture, rather than improving the mobile devices to better capture and convey nonverbal information.

Accordingly, there is a need for technologies that overcome the foregoing problems and provide other benefits. For example, there is a need for a system that improves computing devices, such as smartphones or other mobile devices, to enable the devices to capture nonverbal information in text-based communications, such as text-based communications that are generated from spoken utterances. Additionally, there is a need for a system that can automatically capture this nonverbal information and generate an encoded text representation of a spoken utterance that includes both a text transcription of the spoken utterance and a visual representation of a nonverbal characteristic of the spoken utterance. Furthermore, there is a need for a system that uses machine learning to train one or more models to automatically generate encoded text representations of spoken utterances.

Disclosed herein are systems and related methods for generating encoded text representations of spoken utterances ("system" or "text encoding system"). These encoded text representations capture one or more nonverbal characteristics comprising nonverbal information associated with spoken utterances that would otherwise be lost or omitted when the spoken utterances are reduced to text, such as a speaker's sentiment, speaking rate, volume, pitch, clarity, accent, or timbre. As used herein, "sentiment" is a generalized term referring to one or more nonverbal characteristics of a spoken utterance, such as a mood or feeling, an intended meaning, a demeanor, an affective state, an inflection, or another characteristic, which can be objective, subjective, or a combination of objective and subjective. A sentiment can be as intended by the speaker of the spoken utterance and/or as perceived (e.g., by a recipient). Sentiment can be detected using sentiment analysis and/or other analyses of spoken utterances, transcriptions, visual data, or other data or metadata. To capture a nonverbal characteristic, an encoded text representation includes a text transcription of a spoken utterance and a visual representation of a nonverbal characteristic of the spoken utterance. The visual representation can include variations in one or more text attributes/properties (e.g., font, font color, font size, font weight, other font modifiers). In some implementations, the visual representation can be separate from the text, and can include one or more geometric elements with variations in attributes (e.g., color, shape, dimension, orientation), such as rectangles or other shapes that vary in dimension, for example, to indicate changing volume or a graph or chart comprising a line that rises or falls to indicate changing pitch or inflection.

In operation, the system receives audio data for a spoken utterance comprising human speech. The system uses a text encoding model to identify a nonverbal characteristic of the spoken utterance. Using the identified nonverbal characteristic, the system generates an encoded text representation of the spoken utterance, which includes a text transcription of the spoken utterance and a visual representation of the identified nonverbal characteristic. In some implementations, the system generates the encoded text representation using a trained machine learning model. The encoded text representation can be displayed on a display screen of a computing device (e.g., for review and editing by a user), and the encoded text representation can be incorporated into one or more communications, such as text messages or online or social media posts (e.g., using a mobile application executing on the computing device).

Advantages of the disclosed technology include an improved ability for computing devices to capture and represent nonverbal information in text-based communications. As a result of these technical improvements, computing devices are able to automatically capture and convey a greater amount of information via text-based communications, which reduces the likelihood that text-based communications will be misunderstood or misinterpreted. Additionally, the disclosed technology reduces the amount of time and resources (e.g., computing and/or network resources) necessary to convey information-rich messages. For example, the disclosed technology can be used to convey a greater amount of information in short text-based messages because of the encoded nonverbal information included in the messages, whereas existing technologies might require longer messages or even multiple messages to convey the same amount of information because existing technologies do not adequately capture and visually present nonverbal information.

For purposes of illustration, examples are described herein in the context of capturing nonverbal information from audio data and generating encoded text representations that include the captured nonverbal information (e.g., for inclusion in a post or message generated using a mobile device). However, a person skilled in the art will appreciate that the disclosed technology can be used to capture and encode nonverbal information in other ways and/or for other uses. For example, in some implementations, the disclosed technology can incorporate computer vision and/or other visual technologies to capture nonverbal information from photographs and/or video of a speaker, such as based on the speaker's posture, gestures, facial expressions, eye contact, blink rate, body language, and so forth. These and other kinds of nonverbal information can also be encoded into text representations of spoken utterances. Additionally, a person skilled in the art will appreciate that the disclosed technology can be applied in various contexts. For example, the disclosed technology can be applied to generate encoded text representations of spoken utterances to be included in transcriptions and/or closed captioning (e.g., for videos, movies, television, live events). Additionally or alternatively, the disclosed technology can generate encoded text representations of spoken utterances in other scenarios where it would be advantageous to encode nonverbal information, such as to assist and/or treat people who have difficulty understanding nonverbal information due to a disorder or medical condition (e.g., people who have difficulty understanding social cues, body language, voice inflection, and/or other nonverbal information).

As a further example, the disclosed technology can capture nonverbal information from visual data comprising utterances generated using one or more sign languages (e.g., American Sign Language) and generate encoded text representations that include the captured nonverbal information. In these and other implementations, the visual data can include photos and/or videos depicting one or more persons conveying information via the one or more sign languages. The claimed technology can use computer vision and/or various sentiment analysis techniques to transcribe the utterances and capture one or more nonverbal characteristics of the utterances (e.g., based on facial expressions, variations in the way signing is performed, and so forth). The transcription and the nonverbal characteristics can then be used to generate an encoded text representation, as described herein.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4

(also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG) or wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical layer (PHY), the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Text Encoding System

Figure 2:
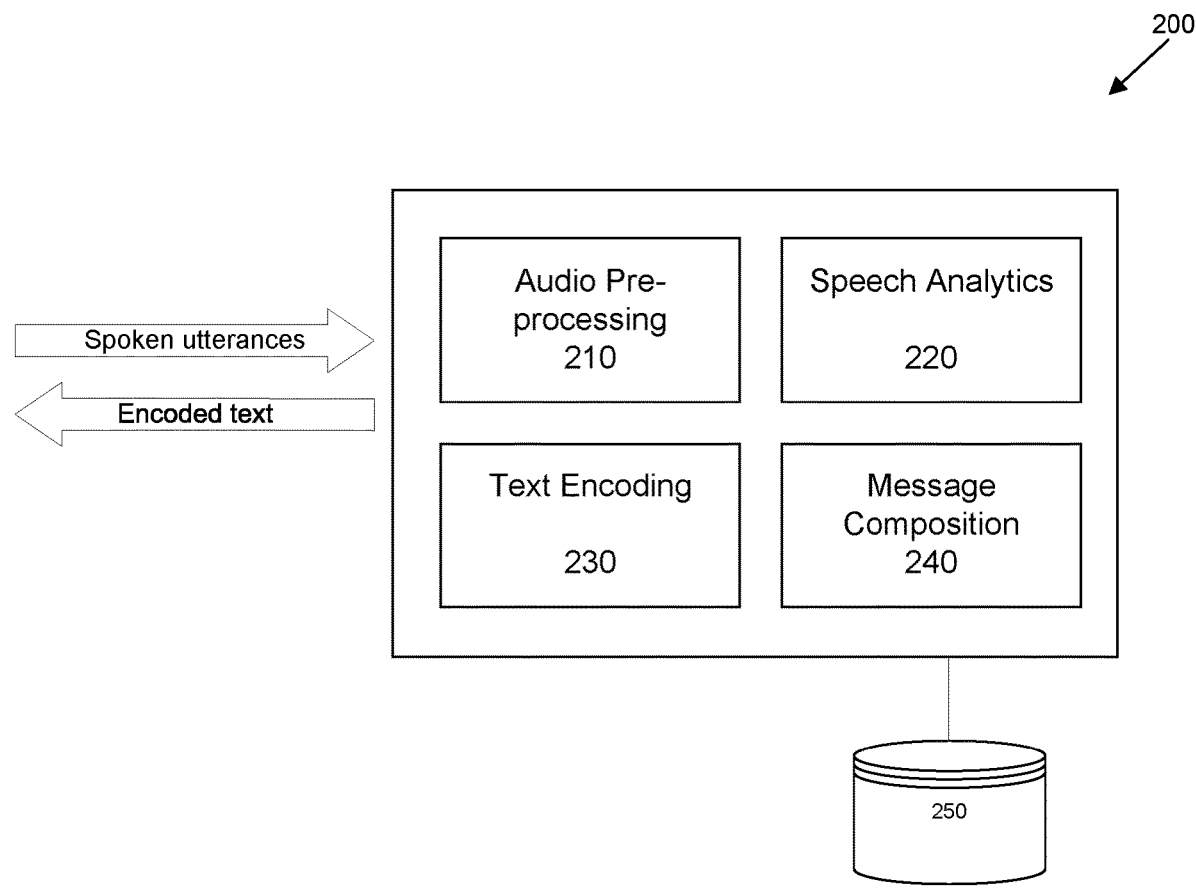
FIG. 2 is a block diagram that illustrates components of a text encoding system in some implementations.

FIG. 2 is a block diagram that illustrates components of a system 200 for generating encoded text representations of spoken utterances. All or portions of the system 200 can be provided, for example, by a telecommunications service provider that provides all or portions of the network 100 using one or more components of the network 100. For example, at least a portion of the system 200 can be implemented using wireless devices 104. In some implementations, at least a portion of the system 200 can comprise a mobile application that performs at least some of the operations described herein. The system 200 can include functional modules that are implemented with a combination of software (e.g., executable instructions or computer code) and hardware (e.g., one or more memories and one or more processors). Accordingly, as used herein, in some examples a module is a processor-implemented module or set of code and represents a computing device having one or more processors that are at least temporarily configured and/or programmed by executable instructions carried in one or more memories to perform one or more of the functions described herein.

The text encoding system 200 includes an audio pre-processing module 210, a speech analytics module 220, a text encoding module 230, and/or a message composition module 240, which are each discussed separately below. Additionally, the text encoding system includes a storage component 250, which can be used to store and/or access data for or used by the system 200, such as raw or processed audio data for spoken utterances, training datasets, encoded text representations, and so forth. The storage component 250 comprises local storage, storage on a server system or on the cloud, or a combination thereof.

Audio Pre-processing Module

The audio pre-processing module 210 receives audio data representing spoken utterances comprising human speech. The audio data can be in any format, such as WAV files or MP3 files and/or as a livestream. In some implementations, the audio data can comprise and/or be received via one or more signals. The audio pre-processing module 210 processes the audio data in various ways. For example, the audio pre-processing module 210 can normalize the audio data based on volume. Additionally or alternatively, the audio pre-processing module can reduce or remove noise or silence from the audio data. Furthermore, the audio pre-processing module 210 can separate audio data into multiple files, such as individual files that each represent a sentence, two sentences, a paragraph, and/or a predetermined length of time (e.g., five seconds, ten seconds, thirty seconds).

Speech Analytics Module

The speech analytics module 220 analyzes speech in received audio data of spoken utterances (e.g., audio data that has been pre-processed by the audio pre-processing module 210). For example, the speech analytics module 220 can generate text transcriptions of spoken utterances. Additionally, the speech analytics module 220 extracts and/or identifies nonverbal characteristics of spoken utterances. For example, the speech analytics module 220 can determine speaking rate (e.g., syllables per minute, words per minute), pitch (e.g., average pitch, highest/lowest pitch), timbre, volume (e.g., in decibels), rhythm or patterns (e.g., syncopation), and/or changes in any of the foregoing characteristics. Additionally, the speech analytics module 220 can characterize spoken utterances based on sentiment and/or subjective nonverbal characteristics. To determine and/or identify these and other characteristics, the speech analytics module 220 can employ various audio processing and/or speech analytics tools, including sentiment analysis. Non-limiting examples of sentiments of spoken utterances that can be identified by the speech analytics module 220 include anger, sarcasm, happiness, surprise, fright, sincerity, sadness, excitement, agitation, or confusion. In some implementations, at least a portion of the speech analytics module 220 can comprise a machine learning model, such as a machine learning model trained as described below with reference to the process 400 of FIG. 4.

Text Encoding Module

The text encoding module 230 generates encoded text representations of spoken utterances (e.g., included in audio data that has been pre-processed by the pre-processing module 210 and/or analyzed by the speech analytics module 220). Encoded text representations are discussed in greater detail below with reference to FIG. 3. An encoded text representation comprises a text transcription of a spoken utterance and a visual representation of a nonverbal characteristic of the spoken utterance. The visual representation can comprise a text attribute (e.g., font, font size, font color), a change in a text attribute, and/or a geometric element, such as a chart or graph and/or a geometric shape that varies in dimension based on a nonverbal characteristic. In some implementations, visual representations can comprise visual and/or tactile textures or patterns, which can facilitate perceptions of the visual representations by people with color-blindness and/or at least partial visual impairment. Additionally or alternatively, a visual representation can comprise a supplementary visual element, such as an emoji or other visual element that is automatically inserted. Thus, an encoded text representation can convey both the content of the spoken utterance (i.e., words spoken or typed) and one or more nonverbal characteristics of the spoken utterance that would otherwise be lost and/or omitted.

To generate an encoded text representation, the text encoding module 230 receives text transcriptions and corresponding nonverbal characteristics for spoken utterances that have been analyzed by the speech analytics module 220. One or more values for the nonverbal characteristics can be mapped and/or associated with specific portions of the spoken utterance and/or the text transcription, such as mapping a characteristic on a syllable-by-syllable basis (e.g., rising/falling pitch or volume). Additionally or alternatively, one or more nonverbal characteristics can be applied to an entire spoken utterance (e.g., to characterize the entire utterance based on a sentiment). In these and other implementations, the mapping between the nonverbal characteristics and the text transcription is used to generate one or more visual representations of the nonverbal characteristics, such as a variation in a text attribute and/or a geometric element.

In some implementations, encoded text representations generated by the text encoding module 230 comprise computer-readable code that, when executed by a computing device, causes display of an encoded text representation. For example, the text encoding module 230 can use a markup language (e.g., HyperText Markup Language (HTML)) to provide computer-readable code representing encoded text representations, which can be executed by a computing device to display one or more encoded text representations on a screen or other output device. The computer-readable code can comprise instructions for mapping the nonverbal characteristics to the text transcriptions and/or displaying the visual representations of the nonverbal characteristics, such as visual representations comprising variations in text attributes. The computer-readable code can provide instructions defining any text attribute and/or variation in text attribute, including font, font size, font color or gradient, font weight, italics, underlining, subscript, superscript, and so forth. Additionally or alternatively, the text encoding module 230 can generate computer-readable code using a predefined and/or customized font comprising various characters that can be used to provide the visual representations (e.g., characters having various text attributes that can be used to generate the visual representations).

In some implementations, the text encoding module 230 trains and/or employs one or more machine learning models to generate encoded text representations of spoken utterances. Machine learning model training is discussed in greater detail below with reference to the process 400 of FIG. 4.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the text encoding module 230 can include a neural network with multiple input nodes that receive training datasets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used to make one or more predictions and/or take other actions. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to generate encoded text representations of spoken utterances.

Message Composition Module

The message composition module 240 facilitates composition of messages using encoded text representations of spoken utterances (e.g., generated by the text encoding module 230). In some implementations, the message composition module 240 allows a user of a mobile device to generate a speech-to-text message that includes an encoded text representation of a spoken utterance of the user (e.g., an utterance included in an audio or video input). For example, the message composition module 240 can be included in or integrated with a mobile application, and the user can use the application to generate a text message using speech-to-text. The text message includes an encoded text representation, which provides nonverbal information about the user's spoken utterance.

The message composition module 240 can provide one or more graphical user interfaces (GUIs) to facilitate editing and/or approving messages that include encoded text representations. For example, the message composition module 240 can generate and display a draft of a text message that includes an encoded text representation of a spoken utterance of a user. The user can then view the displayed draft message in a GUI to determine whether the encoded text representation correctly captures nonverbal information in the spoken utterance (e.g., the user's intended meaning and/or sentiment). The user can then edit the draft message as appropriate and/or indicate approval of the message (e.g., by selecting a button or icon) and send the message to a mobile device of a recipient of the message.

In some implementations, the message composition module 240 can generate suggestions and/or prompts to facilitate composition of messages. For example, the message composition module 240 can detect that an encoded text representation indicates anger or sarcasm in a spoken utterance, and the message composition module 240 can suggest changes to the spoken utterance that would cause the spoken utterance to be perceived as less angry or sarcastic (e.g., "lower your volume," "increase your pitch," "try changing your inflection"). These and other suggestions can be displayed in a GUI provided by the message composition module 240 to allow a user to better understand how a spoken utterance is perceived, and to re-record an appropriate spoken utterance based on the user's intended meaning or sentiment.

In some implementations, the message composition module 240 facilitates composition of other messages and/or text-based communications, such as documents, online or social media posts, emails, transcriptions and/or closed captioning, and so forth.

Encoded Text Representations

Figure 3:
FIG. 3 is a display diagram that illustrates encoded text representations of spoken utterances in some implementations.

FIG. 3 is a display diagram that illustrates encoded text representations 310-340 of spoken utterances in some implementations, such as encoded text representations generated by the text encoding module 230 of the system 200 of FIG. 2. Each of the depicted encoded text representations 310-340 are based on the same text transcription of a spoke utterance, "This sentence is creative." However, the representations are each encoded with a different nonverbal characteristic to illustrate how nonverbal information can be communicated using a text encoding system in some implementations.

The encoded text representation 310 includes a visual representation of a speaker's sentiment (i.e., anger or lack thereof) detected by the disclosed system in the spoken utterance upon which the encoded text representation 310 is based. In the depicted example, the visual representation comprises a variation in the color of the text. For example, text rendered in blue can indicate a lack of anger, while text rendered in red can indicate the presence of anger (e.g., based on the user's pitch, volume, timbre, speaking rate, and so forth).

Similarly, the encoded text representation 320 includes a visual representation of a speaker's intended meaning (i.e., sarcasm) detected by the disclosed system in the spoken utterance upon which the encoded text representation 320 is based. In the depicted example, the visual representation comprises a variation in color of the text. For example, text rendered in green can indicate that the portion of the utterance is intended sarcastically, while text rendered in black can indicate that the portion of the utterance is not intended sarcastically or is otherwise neutral.

The foregoing examples include visual representations that can be generated based on sentiment analysis and/or one or more other speech analytics tools that assess sentiment (e.g., mood, emotional or affective state, attitude, intended meaning, inflection). Although the depicted examples use color coding to indicate the specified characteristics, other kinds of visual representations can be used, such as visual and/or tactile textures or patterns, or changes in other text attributes (e.g., font, font size, italics, bold, superscript, subscript, all caps) and/or geometric elements, which are discussed below. Although the depicted examples, use a two-color gradient to indicate changes in characteristics, a different color system can be used (e.g., grayscale, three colors, four colors, etc.). Additionally or alternatively, changes in the visual representation can be indicated at greater or smaller intervals (e.g., per syllable, per word, per sentence, per paragraph).

Encoded text representation 330 includes a visual representation of a speaker's volume measured and/or detected by the disclosed system in a spoken utterance. In the depicted example, the visual representation is a geometric element comprising a graph of a line that rises when the speaker's volume increases and falls when the speaker's volume decreases.

Encoded text representation 340 includes a visual representation of a speaker's pitch or inflection measured and/or detected by the disclosed system in a spoken utterance. In the depicted example, the visual representation is a geometric element comprising a rectangle. Each rectangle corresponds to a syllable in the spoken utterance. Thus, the width of each rectangle corresponds to a syllable in the text transcription of the spoken utterance. The height of each rectangle is based on the pitch or inflection of the corresponding syllable, with a taller rectangle indicating a higher pitch/inflection and a shorter rectangle indicating a lower pitch/inflection.

Although the encoded text representations 330 and 340 depict geometric elements of a line and a rectangle, respectively, other geometric elements can be used, such as charts or other graphs, dots/scatter plots, circles, triangles, curves, and so forth.

Although the encoded text representations 310-340 relate to specific nonverbal characteristics and visual representations, any combination of nonverbal characteristics and visual representations can be used. Additionally, any number of encoded text representations can be generated for a spoken utterance. In some implementations, the disclosed system can overlay multiple encoded text representations and/or visual representations. Furthermore, in some implementations, the disclosed system can generate multiple encoded text representations for a same spoken utterance and nonverbal characteristic, such as a first encoded text representation with a color-coded visual representation and a second encoded text representation with a geometric element.

Machine Learning Model Training

Figure 4:
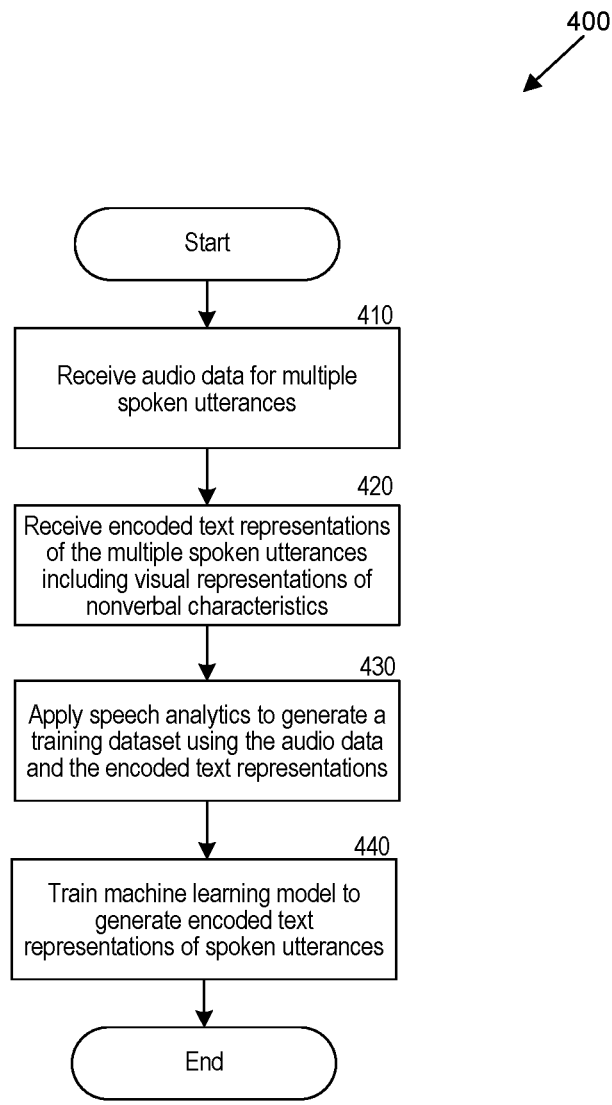
FIG. 4 is a flow diagram that illustrates a process to train a machine learning model to generate encoded text representations of spoken utterances in some implementations.

FIG. 4 is a flow diagram that illustrates a process 400 to train a machine learning model to generate encoded text representations of spoken utterances. The process can be performed, for example, by the text encoding module 230 of the system 200 of FIG. 2.

The process 400 begins at block 410, where audio data is received for multiple spoken utterances, such as hundreds or thousands of spoken utterances. The audio data can be received in various formats, such as WAV files or MP3 files. In some implementations, the audio data can be pre-processed, such as by removing noise or silences, normalizing, or separating files into individual utterances (e.g., sentences or paragraphs).

At block 420, the system receives encoded text representations corresponding to each of the spoken utterances received at block 410. As described herein, each encoded text representation comprises a text transcription of the corresponding spoken utterance and a visual representation of a nonverbal characteristic of the spoken utterance. Each encoded text representation can include metadata, such as metadata indicating one or more nonverbal characteristics represented in the visual representation. The encoded text representations can comprise and/or be received as computer-readable code, as described herein.

At block 430, the system generates a training dataset using the received audio data and the received encoded text representation. Generating the training dataset includes applying one or more speech analytics models to the received audio data to identify audio characteristics in the audio data that correspond to nonverbal characteristics indicated in the corresponding encoded text representation. For example, a speech analytics model can use sentiment analysis and/or audio processing techniques to determine audio characteristics of the audio data (e.g., changes in pitch, inflection, timbre, tone of voice, speaking rate) that indicate one or more nonverbal characteristics (e.g., sentiment).

At block 440, the system trains a machine learning model using the generated training dataset to generate encoded text representations based on received audio data. Although the illustrated process 400 depicts training a single machine learning model, any number of machine learning models can be trained using any number of training datasets and/or different sets of audio data and encoded text representations. For example, different machine learning models can be trained to detect different nonverbal characteristics of spoken utterances (e.g., a first model to detect sarcasm and a second model to detect anger).

Although the illustrated process 400 depicts training a machine learning model based on audio data and corresponding encoded text representations, other kinds of data can be used. For example, visual data (e.g., photos and/or video of a speaker) can be used, either in addition to or as an alternative to audio data. In these and other implementations, the system can use computer vision and/or other visual processing techniques to determine nonverbal characteristics, such as based on eye contact, body language, gestures, facial expressions, and so forth.

In some implementations, the process 400 can include evaluating and/or retraining the trained machine learning model. For example, a portion of training data (i.e., audio data and corresponding encoded text representations) can be held back as testing data to be used to evaluate accuracy of the trained machine learning model. When the trained machine learning model does not exceed a threshold accuracy, the machine learning model can be retrained. Retraining the machine learning model can include training the machine learning model at least a second time using the same training dataset, training the machine learning model with a different (e.g., expanded) training dataset, applying different weightings to a training dataset, rebalancing and/or resampling a training dataset, and so forth. Through retraining, the model can be made more accurate, such as to correct for variances between expected outcomes and actual outcomes (e.g., for representations of nonverbal characteristics) and/or to correct for model drift (e.g., degradation in model performance over time due to a change in environment, data patterns, or assumptions underlying a model). In some implementations, a model can be retrained to maintain accuracy over time, such as to account for changes in language or usage (e.g., new words, slang), culture, habits or patterns, accents, and so forth. Various techniques can be used to train and/or retrain the machine learning model. For example, adaptive boosting can be used, which is an iterative process that runs multiple tests on a collection of training data. Adaptive boosting transforms a weak learning algorithm (e.g., an algorithm that performs at a level only slightly better than chance) into a strong learning algorithm (an algorithm that displays a low error rate, e.g., below a threshold error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting can use, for example, weak classifiers that are single-split trees with only two leaf nodes.

Generating Encoded Text Representations

Figure 5:
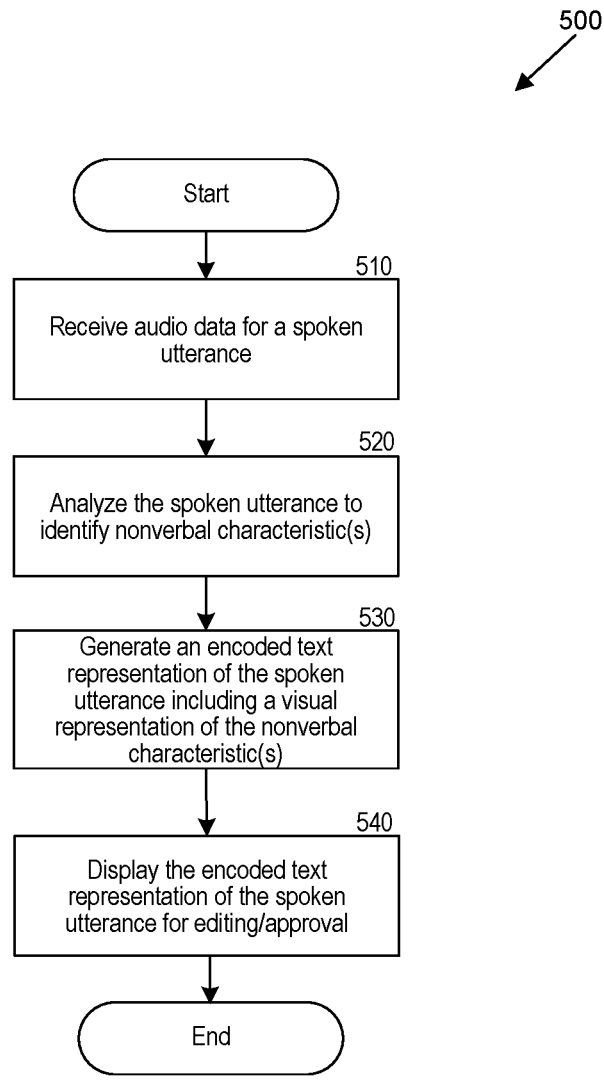
FIG. 5 is a flow diagram that illustrates a process to generate an encoded text representation of a spoken utterance in some implementations.

FIG. 5 is a flow diagram that illustrates a process 500 to generate an encoded text representation of a spoken utterance. The process 500 can be performed, for example, using the text encoding module 230 of the system 200 of FIG. 2.

The process 500 begins at block 510, where audio data is received for a spoken utterance. The audio data can be received in various formats, and the audio data can be recorded or received in real time. In some implementations, the visual data can be received in addition to, or as an alternative to, the audio data (e.g., visual data that includes audio). In these and other implementations, audio data can be extracted from the visual data and/or the audio and visual data can be analyzed together (e.g., at block 520). For example, the audio data can comprise speech of a mobile device user who is generating a message or post using a speech-to-text feature. In some implementations, the received audio data is pre-processed (e.g., to normalize volume, remove noise and/or silences, transcribe audio, and so forth).

At block 520, the system analyzes the audio data to identify one or more nonverbal characteristics of the spoken utterance. In some implementations, the audio data is analyzed using one or more speech analytics tools or models. In some implementations, the audio data is analyzed using a trained machine learning model, such as a text encoding model.

At block 530, the system generates an encoded text representation of the spoken utterance. The encoded text representation comprises a text transcription of the spoken utterance included in the audio data and a visual representation of the nonverbal characteristic identified at block 520. The visual representation can include a variation in a text attribute (e.g., font, font size, font color, italics, subscript, superscript, all caps, bold, underline) and/or a geometric element, as described herein. To generate the encoded text representation, the disclosed system uses a trained machine learning model. In some implementations, the system generates an encoded text representation comprising computer-readable code, as described herein.

At block 540, the system causes display of the generated encoded text representation. The representation can be displayed, for example, in a GUI on a display screen of the mobile device of the user who provided the audio data at block 510. In some implementations, the GUI is integrated into an application, such as a messaging application, a social media application, or a browser. The user can review the generated encoded text representation, such as to determine whether the user's intended meaning is consistent with the encoded text representation. The user can edit the encoded text representation, such as by correcting errors in a transcription, modifying the visual representation, or repeating the process 500 with a new spoken utterance. When the user is satisfied with the generated encoded text representation, the user can indicate approval (e.g., by selecting a button or icon) and/or use the generated encoded text representation (e.g., by sending a message or completing an online or social media post).

In some implementations, the process 500 includes generating and displaying a suggestion by the system, such as a suggestion based on a nonverbal characteristic of the spoken utterance. For example, the system can determine that an utterance is perceived to be angry or sarcastic, and the system can generate and display suggestions for the user in case the user does not intend to be perceived as angry or sarcastic.

A person skilled in the art will appreciate that the processes 400 and 500 can be performed in any order, including performing operations in parallel and/or repeating operations. Furthermore, operations can be added to or removed from the processes 400 and 500 while maintaining a similar functionality.

Computing System

Figure 6:
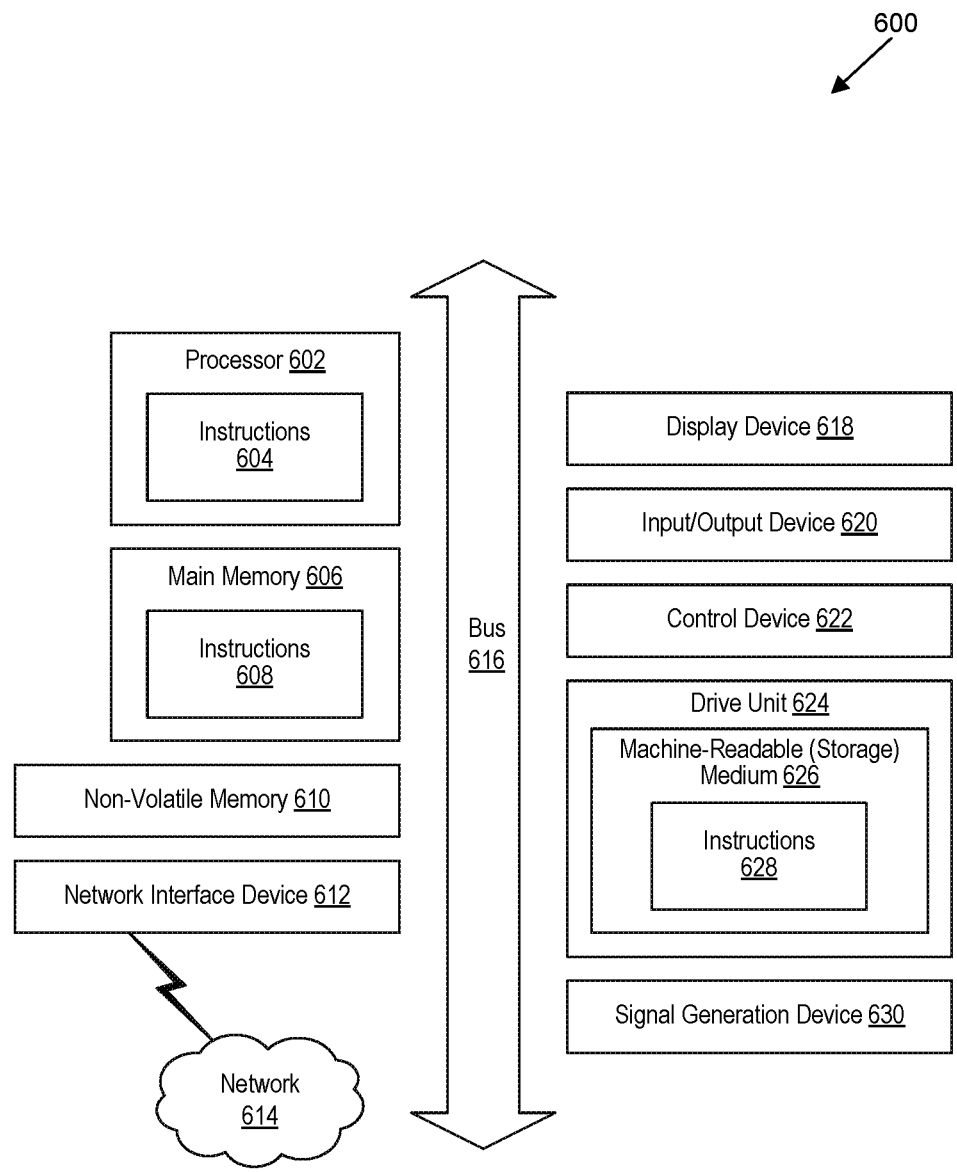
FIG. 6 is a block diagram that illustrates an example of a computing system in which at least some operations described herein can be implemented in some implementations.

FIG. 6 is a block diagram that illustrates an example of a computing system 600 in which at least some operations described herein can be implemented. As shown, the computing system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computing system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computing system 600 can be an embedded computer system, a system-on-chip (SOC), a single-board computer system (SBC) or a distributed system such as a mesh of computer systems or include one or more cloud components in one or more networks. Where appropriate, one or more computing systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

We claim:

1. A mobile device for generating encoded text to convey nonverbal meaning based on audio inputs, the mobile device comprising:
   at least one hardware processor;
   at least one hardware display screen; and
   at least one non-transitory memory carrying instructions that, when executed by the at least one hardware processor, cause the mobile device to:
      analyze audio data for a spoken utterance using a text encoding model to identify a nonverbal characteristic including a sentiment of the spoken utterance;
      generate, by the text encoding model, an encoded representation of the spoken utterance, the encoded representation comprising a transcription and a visual representation of the nonverbal characteristic of the spoken utterance;
      generate, based on the nonverbal characteristic, a prompt to input a second spoken utterance comprising at least one suggestion for changes to one or more different nonverbal characteristics indicative of a different sentiment; and
      cause display, on the at least one hardware display screen, of the encoded representation and the prompt.

2. The mobile device of claim 1, wherein the instructions further cause the mobile device to:
   modify the encoded representation in response to a received input; and
   receive an indication that the modified encoded representation is approved.

3. The mobile device of claim 1, wherein the instructions further cause the mobile device to:
   receive second audio data for the second spoken utterance; and
   incorporate the encoded representation into a message or a post using a mobile application executing on the mobile device.

4. The mobile device of claim 1, wherein generating the encoded representation of the spoken utterance further causes the mobile device to:
   automatically insert into the encoded representation an emoji or a set of characters based on the identified nonverbal characteristic of the spoken utterance.

5. The mobile device of claim 1, wherein the instructions further cause the mobile device to:
   receive visual data for the spoken utterance,
      wherein the visual data comprises at least one image or video; and
   analyze the visual data,
      wherein the nonverbal characteristic is identified based at least in part on analysis of the visual data.

6. The mobile device of claim 1, wherein the text encoding model includes a machine learning model that is trained, using a training dataset, to generate encoded representations based on audio data of spoken utterances.

7. The mobile device of claim 1, wherein the visual representation of the one or more nonverbal characteristics comprises a geometric element or a variation in a text attribute.

8. The mobile device of claim 1, wherein identifying the nonverbal characteristic of the spoken utterance further causes the mobile device to:

detect, using a speech analytics model, a pitch, a timbre, a tone of voice, an inflection, a volume, or a speaking rate, or a change in a pitch, a timbre, a tone of voice, an inflection, a volume, or a speaking rate corresponding to the nonverbal characteristic.

9. A method for generating encoded text representations to convey nonverbal information based on audio inputs, the method comprising:
analyzing audio data of a spoken utterance using a text encoding model to identify a nonverbal characteristic including a sentiment of the spoken utterance;
generating, by the text encoding model, an encoded representation of the spoken utterance, the encoded representation comprising a transcription and a visual representation of the nonverbal characteristic of the spoken utterance;
generating, based on the identified nonverbal characteristic of the spoken utterance, a prompt to input a second spoken utterance comprising at least one suggestion for changes to one or more different nonverbal characteristics; and
causing display, via a user interface, of the generated encoded representation and the prompt.

10. The method of claim 9, further comprising:
modifying the generated encoded representation in response to a received input; and
receiving an indication that the modified encoded representation is approved.

11. The method of claim 9, further comprising:
receiving second audio data for the second spoken utterance; and
incorporating the displayed encoded representation into a message or a post using a mobile application.

12. The method of claim 9, wherein generating the encoded representation of the spoken utterance comprises automatically inserting into the encoded representation an emoji or a set of characters based on the identified nonverbal characteristic of the spoken utterance.

13. The method of claim 9, further comprising:
receiving visual data for the spoken utterance,
wherein the visual data comprises at least one image or video; and
analyzing the visual data,
wherein the nonverbal characteristic is identified based at least in part on an analysis of the visual data.

14. The method of claim 9, wherein the text encoding model includes a machine learning model that is trained, using a training dataset, to generate encoded representations based on audio data of spoken utterances.

15. The method of claim 9, wherein the visual representation of the one or more nonverbal characteristics comprises a geometric element or a variation in a text attribute.

16. The method of claim 9, wherein identifying the nonverbal characteristic of the spoken utterance comprises:
detecting, using a speech analytics model, a pitch, a timbre, a tone of voice, an inflection, a volume, or a speaking rate, or a change in a pitch, a timbre, a tone of voice, an inflection, a volume, or a speaking rate corresponding to the nonverbal characteristic.

17. At least one computer-readable medium, excluding transitory signals, carrying instructions that, when executed by a computing system, cause the computing system to perform operations to generate encoded to convey nonverbal information based on audio inputs, the operations comprising:
analyzing audio data for a spoken utterance using a text encoding model to identify a nonverbal characteristic including a sentiment of the spoken utterance;
generating, by the text encoding model, an encoded representation of the spoken utterance, the encoded representation comprising a transcription and a visual representation of the nonverbal characteristic of the spoken utterance;
generate, based on the identified nonverbal characteristic of the spoken utterance, a prompt to input a second spoken utterance comprising at least one suggestion for changes to one or more different nonverbal characteristics indicative of a different sentiment; and
cause display of the generated encoded representation and the prompt.

18. The at least one computer-readable medium of claim 17, wherein the operations further comprise:
modifying the generated encoded representation in response to a received input; and
receiving an indication that the modified encoded representation is approved.

19. The at least one computer-readable medium of claim 17, wherein the operations further comprise:
receiving second audio data for the second spoken utterance; and
incorporating the displayed encoded representation into a message or a post using a mobile application.

20. The at least one computer-readable medium of claim 17, wherein generating the encoded representation of the spoken utterance further comprises:
automatically inserting into the encoded representation an emoji or a set of characters based on the identified nonverbal characteristic of the spoken utterance.

* * * * *